(No Model.) 4 Sheets—Sheet 4.
C. C. CLAWSON.
WEIGHING AND WEIGHT PRINTING MACHINE.
No. 379,858. Patented Mar. 20, 1888.
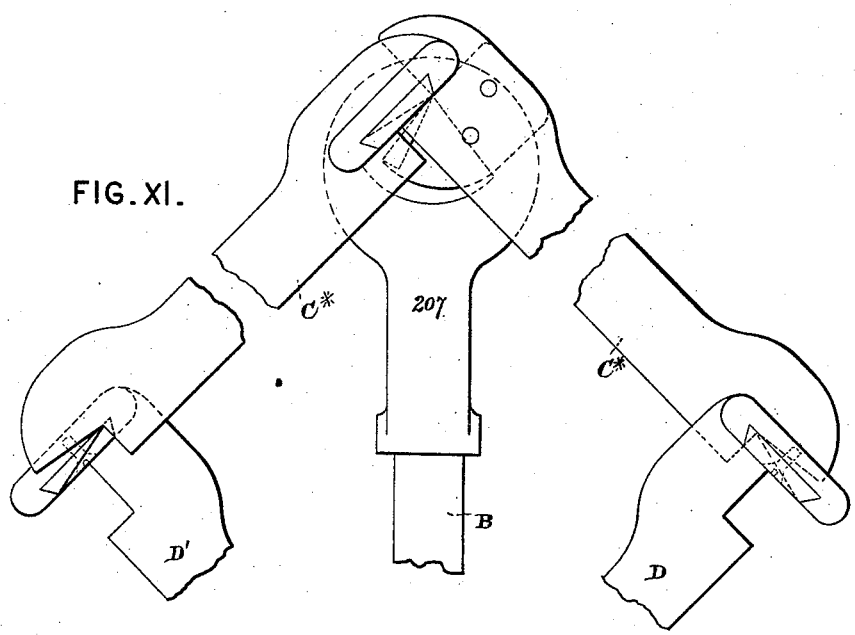
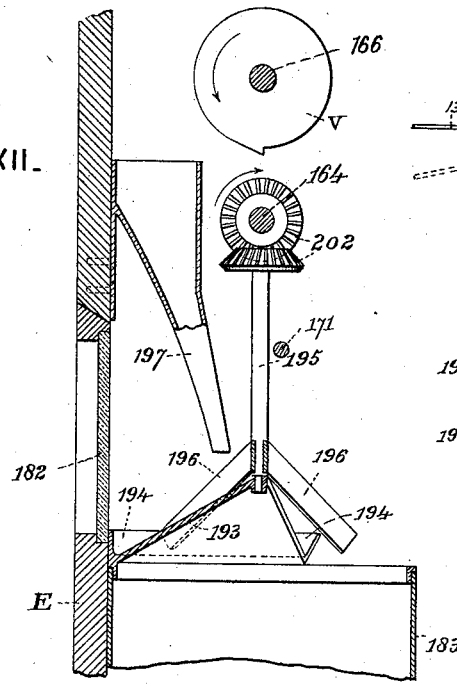
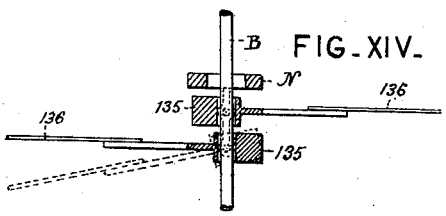
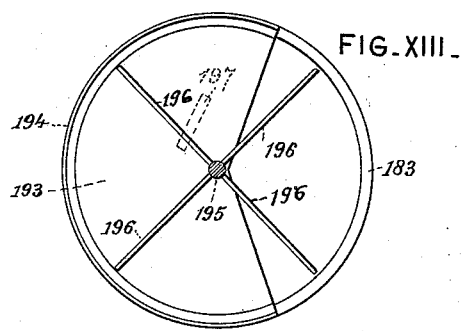

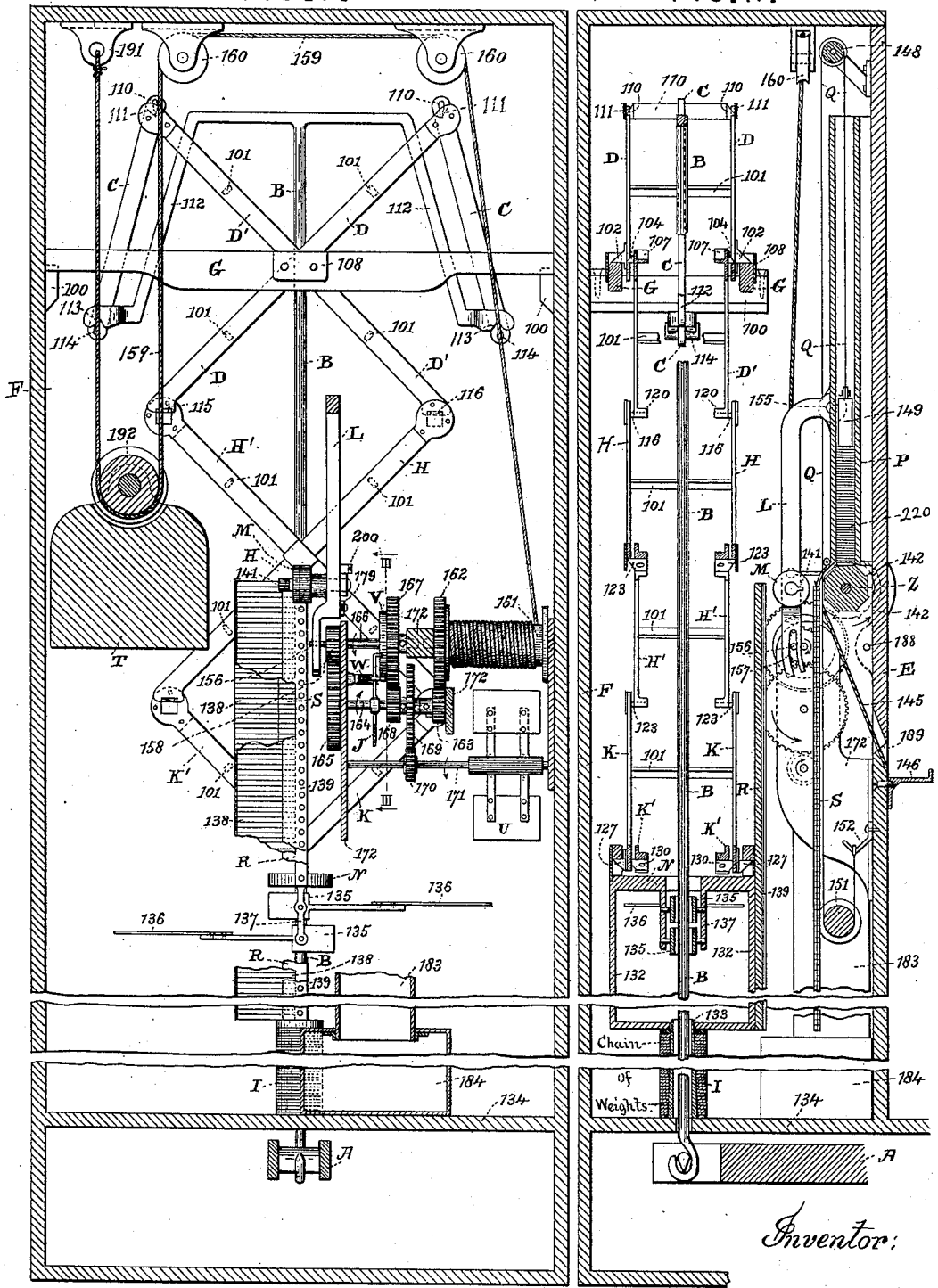

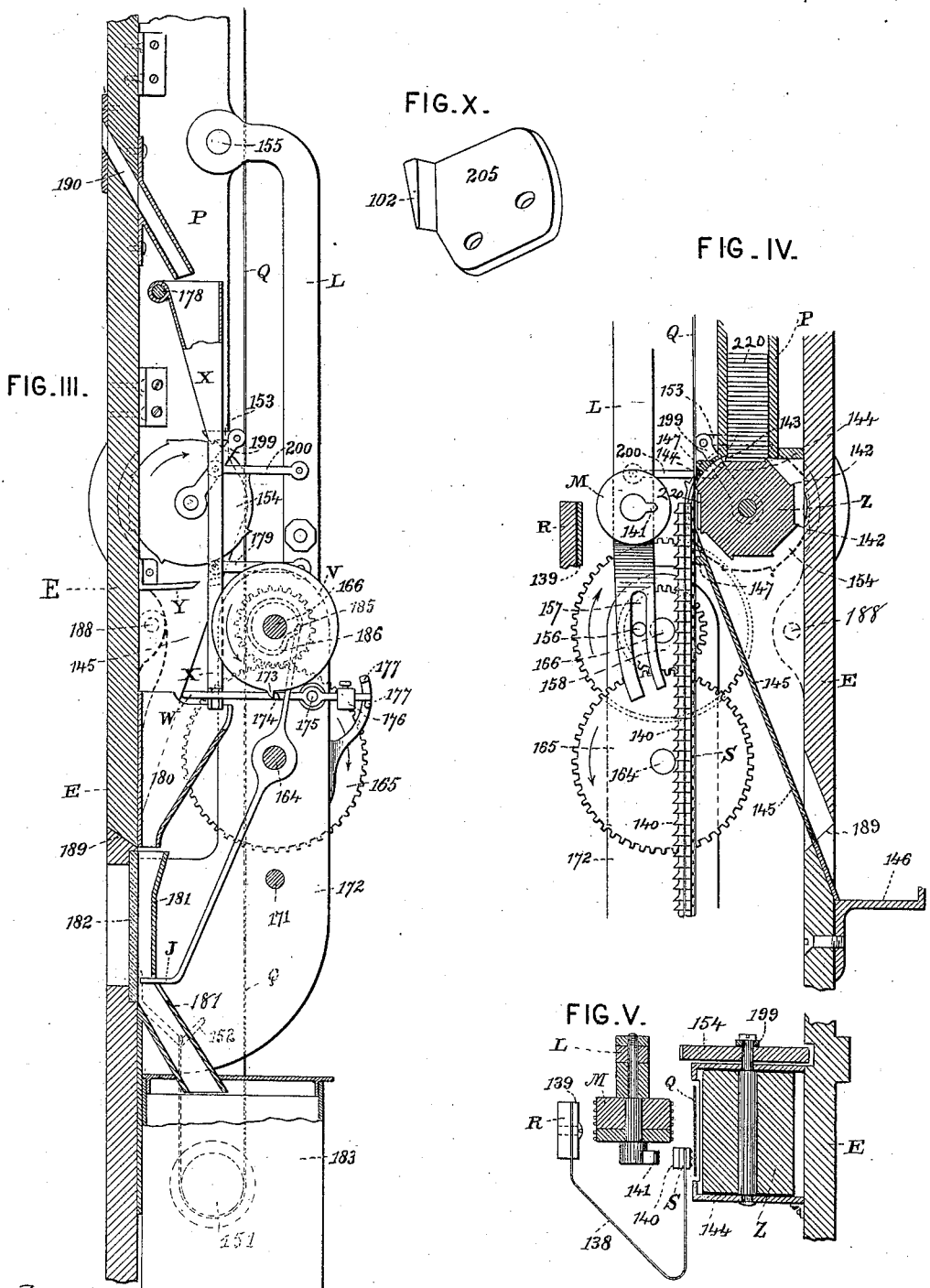

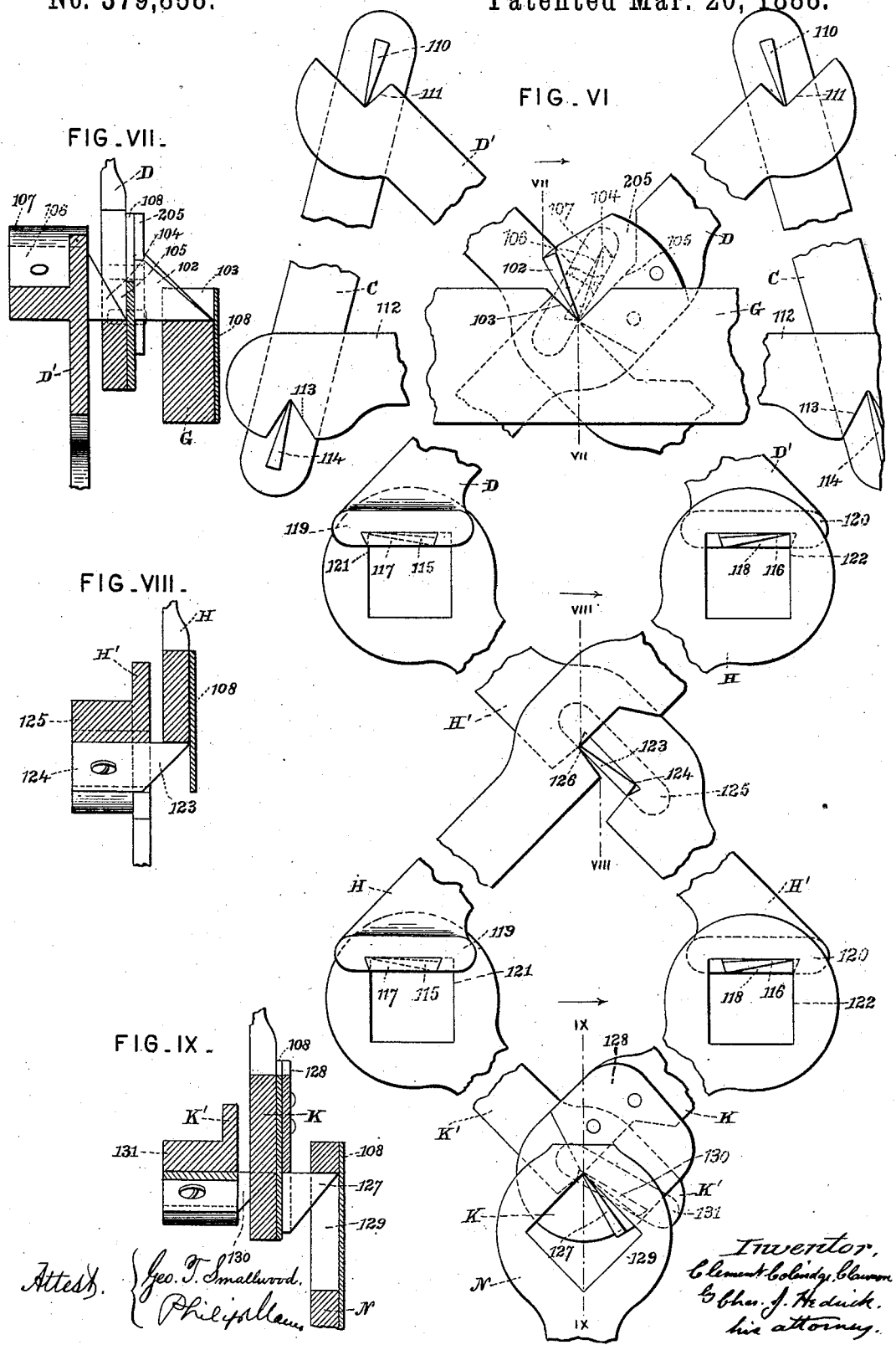

UNITED STATES PATENT OFFICE.

CLEMENT COLERIDGE CLAWSON, OF NEWARK, NEW JERSEY, ASSIGNOR TO THE UNITED STATES MACHINE AND INVENTIONS COMPANY, OF NEW YORK, N. Y.

WEIGHING AND WEIGHT-PRINTING MACHINE.

SPECIFICATION forming part of Letters Patent No. 379,858, dated March 20, 1888.

Application filed April 21, 1887. Serial No. 235,672. (No model.)

*To all whom it may concern:*

Be it known that I, CLEMENT COLERIDGE CLAWSON, a citizen of the United States, residing at Newark, county of Essex, and State of New Jersey, have invented certain new and useful Improvements in Weighing and Weight-Printing Machines, of which the following specification is a full, clear, and exact description.

This invention relates more particularly to machines for weighing persons and delivering to them tickets printed with their respective weights on the introduction of proper coins or tokens into the machine, and is designed as an improvement upon and modification of the machine described in my patent of the United States, dated July 12, 1887, and numbered 366,303. Some of the improvements are, however, applicable to recording and other weighing scales generally, some to ticket-printing mechanisms generally, some to coin motors generally, and some of them may be used in machines for other purposes.

The invention consists, mainly, in the following features and improvements:

First. A system of compensating levers of a kind hereinafter particularly pointed out, or it may be of other known or suitable description, is employed in connection with a series of scale-weights to convey the pressure to the same from the scale-beam, or it may be directly from the scale-pan or scale-platform, so that the said weights as they are successively lifted are moved vertically, and not in the arc of a circle, as they have been heretofore when lifted by levers, and with little or no appreciable friction.

Second. The compensating levers employed in connection with the series of weights, or it may be with other known or suitable form of balancing appliance or appliances, are arranged according to the principle of lazy-tongs, with members adapted in length and number to the conditions of use. The said arrangement of levers, although long known for various purposes, has never, to my knowledge, been employed in a weighing-scale or analogous apparatus, and in such apparatus it possesses important advantages as a means of communicating the pressure from the object weighed to the scale weight or weights, or to other appliance which is to balance said object. They occupy, or may be made to occupy, comparatively little space horizontally. They multiply the motion (or divide the power) very rapidly, and, what is very important in connection with the series of weights, they will give as large a motion as may be required in a straight line.

Third. The system of crossed levers or lazy-tongs is provided with knife-edge joints, so as to work with little or no practical friction, and thus to render the same suitable for accurate weighing and for other purposes where absence of friction is desired. The special arrangement of knife-edges which is adopted in practice will be explained hereinafter. It constitutes a special feature of invention; but a system of levers or lazy-tongs with knife-edge joints being broadly new, the general system irrespective of the precise arrangement is included also.

Fourth. When in a weighing-scale a balance appliance or appliances are used—such as a series of weights, a spring, or a weighted lever-arm, whose effect in balancing weight on the scale increases with the motion of the scale—it is desirable to prevent the sudden motion of the scale which is apt to take place when a person steps on and off the same or pressure is otherwise suddenly applied to or removed from the scale. Heretofore dash-pots and other checks of various kinds have been employed or suggested; but, so far as I am aware, there are difficulties attending their use, such as an interference with the accuracy of weighing. According to the present improvement a fan or winged arm, or equivalent contrivance, and a clutch operated thereby are so arranged that on a quick movement taking place the resistance to the fan's motion is such as to bring the clutch into action and check the movement; but when the motion is slow or ceases, the fan resumes its normal position and releases the clutch, leaving the scale free to balance without friction. A special arrangement and application of this automatic clutch, which will be hereinafter explained, constitutes a special feature of invention; but the general combination is also included, the same being new irrespective of said special arrangement.

Fifth. Instead of placing the type to print the weights on a disk journaled in bearings, or of operating the same through such a disk, the use of which is apt to cause inconvenient friction, they are carried by a bar which is suspended from or supported by the weighing lever or levers, or one of them—that is to say, by the compensating levers or lazy-tongs before indicated—or it may be by other suitable lever or levers. Of course the bar must be of such form and so guided by gravity or otherwise that the numbers come successively opposite the printing-space. A vertical bar connected with the compensating or crossed levers or lazy-tongs is adopted as the best arrangement, and constitutes a special feature of invention; but the general combination, being new, is included also. The type on the aforesaid bar may be of any known or suitable kind; but preference is given to type which can be pushed out to print without moving the bar or interfering with the scale. Of course the means for taking the impression must be adapted to the character of type employed; but there are known means for taking an impression from type which are fixed to their carrier by pressing the material to be printed against them. The means preferably used to take the impression from the movable type will be described hereinafter. Similar means are also set forth in my aforesaid patent.

Sixth. In my aforesaid patent the type are supported by an elastic, flexible, and extensible band of soft rubber, they being formed on said band, and the latter is carried by a disk. Such a type-band may also be used on the type-carrying bar of the preceding section; but a substitute arrangement in which each type is combined with its individual spring or yielding support constitutes a special feature of invention. This arrangement being new irrespective of the nature of the carrier, which is common to the several springs, is not limited to a carrying-bar.

Seventh. In order to insure the correct position of the type to be printed, teeth are or may be provided to be engaged by a finger or similar device during the printing operation for the purpose of adjusting the type or of holding the same stationary, or for both purposes. In my aforesaid patent such teeth are applied in connection with type to be pushed out for printing, the precise form in which the teeth are arranged being such that they form a slotted rim on which the printing-band is placed, a printing-finger passing through the slot between the teeth and pressing out the type which at the time is opposite the said slot. Of course a similar slotted carrier can be used in the present improved machine, or in connection with one or more of the improvements forming part of the present invention; but a modified and it is believed an improved arrangement constitutes a special feature of invention, the substantial new feature being that the teeth are arranged at the back of their support and are formed by notches in contradistinction to slots. They are then more easily made and are stronger.

Eighth. Another special feature of invention consists in placing the type-adjusting or type-retaining teeth on the back of the type themselves, and particularly on the back of the type which are each combined with an individual spring or yielding support. This improvement, it may be observed, and that specified in the preceding section as well, has no relation to type which are fixed to their carrier so that they cannot be pushed out to give an impression.

Ninth. It is preferred to print the weights indicated by the successive weighings upon tickets in the form of cards, which are successively withdrawn from a card-box, printed, and delivered to the person weighing. Card printing and delivering mechanism of this general description is well known; but it has generally been adapted to present the cards horizontally to type which print by a vertical movement; or, if the type is arranged to give the impression by a horizontal movement, the card-box has been placed horizontal. In order to employ the vertical card-box with type giving an impression by a horizontal movement, a feeder has been devised which turns the cards from the horizontal position occupied in the box to a vertical position in front of the type to receive an impression therefrom. The printed card is afterward discharged. This feeder is preferably in the form of a many-sided roller, inclosed on one side, at least, by a suitable case, which keeps the card in place when in a vertical position. In this form it constitutes a special feature of invention; but the general combination of the vertical card-box, the type giving the impression by a horizontal movement, and the feeder for receiving the horizontal card and presenting it in a vertical position are included also.

Tenth. In coin-motors (which terms are intended to include generally mechanism whose action or condition is modified by the introduction of one or more coins or tokens into the machine, and of which mechanism various forms designed for various purposes are known, some of them being adapted to release clock-work or other sources of stored power and others simply controlling a slide or other device to be moved by hand) it is desirable to provide means whereby the introducer of a bogus or counterfeit coin or token may be detected or his detection facilitated. Heretofore in these coin-motors it has been customary to discharge the coin or token at once into the money-box after it has produced its effect on the coin-motor. In accordance with the present improvement the coin or token is kept in view until another coin is introduced into the machine. For this purpose a supplemental discharging coin-holder arranged behind a pane of glass or in other position exposed to view or to other examination, but protected from unauthorized access, is combined with the coin-motor, so as to hold exposed to view the coin which has just produced its effect on the motor and to discharge the same at the next operation of the motor. This general combination admits of a wide range of modifications, and is considered, broadly, to be new and to be within the invention.

The invention further comprises the constructions, combinations, and arrangements of parts, as hereinafter particularly pointed out.

Although the present improvements, or some of them, may be used separately and in machines for different purposes, it is designed to employ them together in one weighing and weight-printing machine with coin-motor attachment, and it will be sufficient to show and describe them as parts of such a machine in order to enable others to make and use the same, it being understood that the illustration and the description are given, by way of example, as representing the best mode which I have contemplated of applying the principle of my said invention and each part thereof.

In the accompanying drawings, which form part of this specification, Figure I is a front view in sectional elevation of a weighing-machine constructed in accordance with the invention, the section being taken through the standard of the machine, and certain parts being broken away to show parts which lie behind them. Fig. II is a view of said standard in central vertical section transverse to the plane of Fig. I and in elevation, looking to the right of said Fig. I. Fig. III is a partial view, on a larger scale, in section on line III of Fig. I, looking to the left. Fig. IV is a partial view, on a similar scale, in the plane of Fig. II. Fig. V is a partial view in horizontal section. Fig. VI is a front view, on an enlarged scale, of the system of compensating levers or lazy-tongs, with the middle parts of the levers removed and the ends set close together, the plates which in Fig. I cover the knife-edges at the joints being omitted. Fig. VII is a sectional view on line VII of Fig. VI in elevation, looking to the right. Fig. VIII is a similar view on line VIII of Fig. VI. Fig. IX is a similar view on line IX of Fig. VI, and Fig. X is a perspective view of one of the knife-edge plates used at the principal fulcrum of the lazy-tongs. Fig. XI is a front view showing another form of connection between the lazy-tongs and the scale-rod. Fig. XII is a view in vertical section illustrating another form of the supplemental discharging coin-holder, and Fig. XIII is a plan of the last-mentioned holder. Fig. XIV is a detail view in vertical section of the clutch mechanism.

Referring to the machine as represented in Figs. I to X, the beam A of an ordinary platform-scale is connected with the lower end of the scale-rod B, whose branched head 112 is connected by links C with the upper ends of the crossed levers D D′, these latter being fulcrumed in the stationary supporting-bars G, and having their lower ends connected through the suspended crossed levers H H′, links K K′, and hanger N with the series of scale-weights I. The supporting-bars G lie parallel with the front E and back F of the standard and are supported by and fastened to the ledges 100 on the sides thereof. The levers D D′ are each made double, the two members being connected together by cross-bars 101. The levers H H′ and the links K K′ are also made double and have similar cross-bars. The lever D, which is placed between the bars G, is provided at the middle with outwardly-projecting knife-edges 102, which rest in notches 103 in the bars G, (see Figs. II, VI, and VII,) and by which the lazy-tongs (composed of the parts D D′, H H′, and K K′) are upheld.

The lever D′, which is placed between the members of the lever D, is provided at its middle with outwardly-projecting knife-edges 104, which rest in notches 105 in the lever D. (See Figs. VI and VII.) The bearings of the knife-edges 102 and 104 are in the same horizontal line. The knife-edges 102 (see also Fig. X) are each formed in one piece with an attaching-plate, 205, by bending the said plate and grinding off the projecting portion so as to leave it of the proper shape for the knife-edge. The plates are fastened to the outside of the lever D by screws. The knife-edges 104 are each formed by grinding one end of a bar, 106. The bodies of the bars (of dovetail form) fit in grooves in the projections 107 on the inside of the lever D′ and are secured therein by screws. The knife-edges of both sets are beveled on top, (see Fig. VII,) so as to leave a point at the end of each knife-edge, and the point is covered by a plate, 108, to prevent endwise motion. The plates 108 for the knife-edges 102 are fastened on the outside of the supporting-bars G, those for the knife-edges 104 on the outside of the lever D. The object of making the knife-edges pointed is to avoid friction between them and the end plates. It may be here observed that the other knife-edges of the lazy-tongs (hereinafter more particularly described) are also pointed at their free ends and provided with similar end plates.

The links C are each fixed to a cross-bar, 110, whose ends, ground to form knife-edges, rest in notches 111 in the upper ends of the levers D D′ respectively.

The branched head 112 of the scale-rod B is provided with notches 113 and rests upon knife-edges 114 at the lower ends of the link C. Pressure on the scale therefore tends to draw down the beam A, rod B, and links C, and to turn the levers D D′ in opposite directions on their knife-edges 102 and 104, respectively.

The lower ends of the levers D D′ are provided with knife-edges 115 and 116, respectively, which are formed on bars 117 and 118, respectively, whose shanks are secured in projections 119 and 120 on their respective levers as the bars 106 are secured to the lever D′, but at different angles and in different directions, as clearly represented in the drawings. (See Fig. VI.) The knife-edges 115 are turned inward and project into holes 121 in the upper end of the lever H', which is suspended therefrom. The knife edges 116 are turned outward and project into holes 122 in the upper end of the lever H, which is suspended from them.

The lever H', which is placed between the members of the lever H, is provided at its middle with outwardly-projecting knife-edges 123, formed each on the end of a dovetailed bar, 124, secured in a projection, 125, on the inside of the lever. The lever H is provided at the middle with notches 126 and rests upon knife-edges 123, which enter said notches. The lower ends of the levers H H' are precisely like the lower ends of the levers D D'. The upper ends of the links K K' are precisely like the upper ends of the levers H H', and the connection between the levers H H' and the links K K' is precisely like that between the levers D D' and the levers H H', so that no further description is necessary. The parts at the joints between the levers H H' and the links K K' are numbered the same as the corresponding parts of the joints immediately above.

The lower end of the link K is provided with outwardly-projecting knife-edges 127, which are formed on plates 128, fastened by screws to said link K. They enter the holes 129 in the ears of the hanger N, which is supported by the said knife-edges. The lower end of the link K', which is placed between the members of the link K, is provided with outwardly-projecting knife-edges 130, which are secured in projections 131 on the inside of the link. When, therefore, the scale-rod B is pulled downward, the levers D D' are turned so that their ends separate, the levers H H' and links K K' are lifted and turned, and the hanger N is raised directly upward, the motion of the rod B being multiplied by the action of the levers or lazy-tongs. The motion of the hanger is vertical, because the motion of the knife-edges 115 from the center is exactly compensated for by the motion of the knife-edges 116 in the opposite direction.

The scale-weights I are connected with each other, so that they are successively lifted, each scale-weight being lifted a certain distance before the next is engaged. Such weights are known in various forms. The arrangement preferably employed is the chain of weights described in my aforesaid patent, each scale-weight being provided with depending pins which have shanks of suitable length and are headed at the bottom, so that the heads of said pins engage the next weight after being raised the proper distance. The upper weight of the series or chain I is fastened to the stirrup 132, which forms part of the hanger N, so that as said hanger is raised the weight suspended therefrom is progressively increased until the pressure exerted through the rod B is balanced. The weights I are ring-shaped and surround the tapering post 133, which is itself tubular and surrounds the rod B and is fastened to the shelf 134, on which the weights rest when not suspended.

The hanger N, above the weights I, is provided with an automatic friction-clutch (or clutches, rather, since there are two) for preventing a too-rapid motion of the hanger. Each clutch is formed by a pivoted sleeve, 135, and the fan or wing 136. (See Figs. I, II, and XIV.) The two sleeves are arranged one above the other around the rod B and are separately journaled in the arms 137, forming part of the hanger. The fans or wings project in opposite directions and each sleeve is weighted or made thicker on the opposite side of the pivots from its fan, so as to balance the said fan or wing and hold the same horizontal when the hanger is stationary. When, however, the hanger is lifted with sufficient rapidity, the pressure of the air on the wings or fans turns the sleeves and causes them to clutch the rod B and moderate the motion of said hanger. The position of the lower clutch when engaging the rod B is indicated in dotted lines in Fig. XIV. When equilibrium is established, the air-pressure is relieved and the clutches are disengaged. When the hanger is drawn down rapidly, the clutches are turned in the opposite direction and press against the rod B, so as to moderate the motion. The clutches would of course operate separately; but two are used, in order to act against the rod equally on opposite sides.

The type-carrier R, in the form of a straight bar, is fastened in a vertical position to the front of the hanger N.

The type S (of metal) are cast separately, and are each fastened at the outer end of a bowed metal spring, 138, whose inner end is secured to the carrier R, the same being clamped firmly against the face of the carrier by the strip 139. Each type is provided on the back with a tooth, 140. (See Figs. IV and V.) The printing-finger 141 is formed on a pin which is fastened to and projects laterally from the side of the printing-lever L. It is arranged in the space between the type S and the carrier R, (see Fig. V,) so that when moved forward it presses upon and carries with it the type which for the time being happens to be in front of it. The type being carried by the hanger N are adjusted by the movements of the latter under the influence of the weight on the scale, and the parts are to be so proportioned and arranged that the number on the type opposite the printing-finger corresponds with the number of pounds on the scale. The effect of the teeth on the back of the type is that the latter are held from vertical motion in printing, and if the particular type to be printed should be a little above or below the correct position the finger, acting against one of the teeth, will force all of the type up or down until the correct position is attained. Alongside the printing-finger are the wheels M, forming a dating-stamp.

The cards 220, upon which the weights are to be printed, are placed horizontally in a vertical card-box, P, and presented vertically to the type by means of the feeder or many-sided feed-roller Z. (See Fig. IV.) This is revolved step by step and has projections 142, each of which in turn catches the card at the bottom of the box and pushes it out through an open space, 143, at the back of the box into the curved case 144, which holds the cards in place on the roller until after they have passed in front of the type S and been printed upon, when they are discharged down the incline 145 and through the slot at the bottom thereof onto the outside shelf, 146.

The case 144, opposite the printing-finger, is cut away, so that a type may be pushed in to make an impression on the card which for the time being is opposite said finger. Between the type and the feeder Z is the carbon or ink ribbon Q. It is held away from the feeder Z and from the edges of the cards by the projections 147 above and below the cut-away portion, but can, of course, be pushed against the cards between the projections.

The ribbon Q runs over a pulley, 148, at the top of the case, and is connected with the pressure-weight or follower 149, which rests upon and is supported by the cards in the box P. As the cards are removed successively, the follower 149 descends by degrees and moves the ink-ribbon, so as to present each time a fresh surface for printing. The ink-ribbon is kept stretched by the weight 151, suspended in the bight of said ribbon, the end of the latter being fastened to the bracket 152 on the front E of the standard.

The feeder Z is turned step by step by the pawl 153, carried by the lever-arm 199, fulcrumed on the journal of the feeder Z, said pawl engaging the ratchet 154, fixed on the said journal. The arm 199 is connected by a link, 200, with the printing-lever L. The printing is done on the forward stroke of the lever L, and the pawl moves the feeder on the return-stroke, so that the newly-printed card is at once discharged.

The printing-lever is pivoted at 155 to the side of the card-box P, and is reciprocated by the crank-pin 156 engaging the slot 157 in the lower end of the lever. The pin 156 projects from the outer face of a pinion, 158, which is revolved by the weight T through an ordinary clock-work provided with a regulating-fan, U.

The weight T, suspended in the bight of the wire cord 159, which is fastened to an eye, 191, on the top of the standard, runs around the pulley 192 on the weight T, over the pulleys 160, fastened to the top of the standard, and is wound upon the drum 161. The spur-wheel 162 turns with the drum 161, and from it the motion is conveyed to the pinion 158 through the pinion 163, shaft 164, and spur-wheel 165. The pinion 158 is fast on the shaft 166, and from this shaft the fan U is driven through the spur-wheel 167, fast on the shaft 166, the pinion 168 and spur-wheel 169, loose on the shaft 164, and the pinion 170, fast on the fan-shaft 171. The various shafts are journaled in bearings of a frame, 172 fastened to the front E of the standard.

Attached to the side of the spur-wheel 167 is an escapement-disk, V, having a tooth, 173, which engages the tooth 174 on the escapement-lever W and arrests the movement of the clock-work. The lever W is pivoted at 175 and is provided with an adjustable counter-weight, 176, to hold up the tooth 174 in the path of tooth 173, and there are also stops 177 to limit the motion of the lever. The front end of the lever, which may be and is preferably forked, so as to retain a coin of the proper size, but to let smaller coins pass through, projects across the lower end of the spout X, which is suitably cut away to receive the end of the lever, so that a proper coin passing down the spout will be retained by the lever W, and the weight of said coin, overbalancing the lever, will release the clock-work.

The spout X (see Fig. III) is hinged at 178 and is connected by the rod 179 with the printing-lever L, so that as the clock-work revolves the spout is moved forward and pushes the coin off of the lever. The coin then drops into the chute 180, the escapement-lever W returns to a position in which it will arrest the clock-work when the disk V and crank-pin 156 have made one revolution, and the spout X is by the rotation of the crank-pin 156 brought back to its normal position. Below the chute 180 is another chute or passage, 181, one side of which is formed by a transparent pane of glass, 182, set in an opening in the front E of the standard, and a supplemental coin-holder, J, is arranged in the passage, so as to stop a descending coin and hold it exposed to view until the withdrawal of the coin-holder J allows it to drop. The chute or passage 181 communicates with a tube, 183, screwed into the top of the money-box 184. The coin-holder, which may be and preferably is forked the same as the escapement-lever and for a like purpose, is formed by the end of a lever fulcrumed on the shaft 164 and provided at the upper end with a pin, 185, which projects into a cam-groove, 186, in the side of the disk V. The shape of this cam-groove is such that during the first quarter of the revolution the coin-holder J is withdrawn to allow the coin to drop and is returned to receive a new coin.

The length of the escapement-lever W is such that the coin is discharged therefrom during the second quarter of the revolution after the coin-holder has been returned. Each coin, therefore, after it has produced its effect on the coin-motor, is kept exposed to view by the supplemental coin-holder J, and is discharged when another proper coin has been introduced into the machine. A stationary knife, Y, is arranged to enter a slot in the spout X when this is moved forward, and if a string should be attached to the coin the knife will cut it and allow the coin to drop.

In order to give access to the card-box and other parts of the machinery, the upper part of the front E is hinged at 188, the lower line of division between the movable and the immovable portion of the front being at 189. In turning the movable part of the front E the portion below the hinge 188 moves inward and the part above outward through a comparatively small angle.

When a person desires to weigh himself with this machine, he first steps on the scale-platform. His weight forces down the beam A, and the rod B turns the levers D D' H H' K K' of the lazy-tongs and lifts the hanger N, raising the weights I successively and moving the type S in front of the printing-finger 141 until equilibrium is established. The tendency to too-rapid motion of the hanger N is resisted by the automatic action of the clutch-sleeves 135. The type representing the weight of the person being now opposite the printing-finger, and a card on the feeder Z being in front of the type, a proper coin or token is to be introduced through the slot 190, Fig. III, into the spout X. Its fall is arrested by the escapement-lever W, whose front end is borne down, releasing the clock-work, which is thereupon revolved by the weight T and moves the printing-lever L forward through the crank-pin 156, so as to press the type against the card with the ink-ribbon Q interposed. The printing-finger 141 engages a tooth, 140, on the back of the type and holds the latter from vertical motion with or without first adjusting it slightly. After the printing takes place, the printing-lever L is returned, and the feeder or feed-roller Z is turned one step, discharging the newly printed card, introducing a blank card in place, and withdrawing a card from the card-box P. The withdrawal of the card allows the follower 149 to move down and shift the ink-ribbon Q. During the first part of the movement of the clock-work the supplemental coin-holder J is withdrawn to drop the coin previously held thereby, and is then returned in time to receive the newly-introduced coin, which is pushed off the escapement-lever W by the forward movement of the spout X. The front end of the escapement-lever, being relieved of the weight of the coin, rises and arrests the clock-work when one revolution of the disk V and crank-pin 156 has been completed. The coin introduced remains exposed to view behind the glass 182. until the next coin is introduced, and an attempt to employ a bogus coin may by this exposure be detected. When the person weighed steps off of the scale, the lazy-tongs are drawn down, the scale-weights I settling down into a pile. A too-rapid motion of the parts is prevented by the automatic action of the clutches on the hanger N.

In Fig. XI, instead of connecting the upper ends of the levers D D' with the scale-rod B by depending links C, they are connected therewith by a toggle, C*, the scale-rod B being attached to the center joint of the toggle by a hanger, 207. The arrangement with the links is preferred, as somewhat steadier.

In Figs. XII and XIII the supplemental coin-holder is formed by an inclined shelf, 193, in the form of a segment of a hollow cone, provided with a rim, 194, for the coin to rest against. A vertical shaft, 195, driven from the shaft 164 through the bevel-gears 202, is provided with wings 196, which sweep over the shelf and discharge the coin into the tube 183, which leads to the money-box. The coins, after operating the coin-motor, are each received on the shelf 193 from a spout, 197, between the two of the wings 196 which at the time are in the proper positions to receive the same, and are then carried around and exposed to view until discharged into the tube 183. One or more coins may thus be exposed to view at the same time, according to the length of the shelf and number of wings on the shaft. As the shaft shown has four wings, the gearing for revolving the same is such as to give it a quarter-turn for each revolution of the disk V and crank-pin 156, and the parts so arranged that the space between the wings is brought directly under the spout 197 when the coin is discharged from the escapement-lever.

The pane of glass, 182, in the front E of the standard just above the shelf 193 enables the coins to be seen.

In the drawings and the description of the machinery represented therein details have been given for the purpose of better enabling others to make and use the invention, which is not restricted to the said details, as they can be changed while still employing the substance of the invention.

Parts of the invention can be used separately, as pointed out in the first part of this specification, and some of them otherwise than in weighing-machines.

I claim as my invention or discovery—

1. The combination, with the scale-beam and the series of scale-weights, of the compensating levers connected with said scale-weights and also with said beam for communicating the pressure from said beam to said weights, so as to lift them successively by rectilinear motion, substantially as described.

2. The combination of a system of crossed and connected levers or lazy-tongs with a scale-beam and a balance appliance or appliances connected with said levers or lazy-tongs, which communicate the pressure from said beam to said appliance or appliances, substantially as described.

3. The combination of the system of crossed and connected levers or lazy-tongs with the series of weights connected with said levers or lazy-tongs, substantially as described.

4. The system of crossed and connected levers or lazy-tongs provided with knife-edge joints, substantially as described.

5. The combination of the supporting cross-bars, the crossed levers supported by said bars, the crossed levers suspended from said first-named levers, the links suspended from the last-named levers, the hanger suspended from said links, and the knife-edges forming the joints of said system of levers, substantially as described.

6. The system of double levers, one of each pair being placed between the members of the other lever of said pair, in combination with the duplicate knife-edges forming hinge-joints between the said levers, substantially as described.

7. In combination with a weighing-scale having a balancing appliance or appliances whose balancing effect increases with the motion of the scale, a clutch or clutches tending to arrest or moderate the movement of said scale and provided with fans or wings moving with a portion of said scale and arranged to bring said clutches into action when moved rapidly, substantially as described.

8. An automatic clutch consisting of a pivoted clutch-sleeve, a fan or wing on one side of said sleeve, and a counter-balance for said wing or fan, substantially as described.

9. The combination, with the scale-rod, the system of levers, and the hanger, of one or more clutches provided with a counterbalanced fan or fans for bringing said clutch or clutches into action, the latter being carried by said hanger and arranged to clutch said rod, substantially as described.

10. The combination, with a balance appliance or appliances and a lever or levers provided with knife-edge bearings and connected with said appliance or appliances, so as to convey to the same the pressure of the object weighed, of a bar supported directly by said lever or levers and printing-type carried by said bar, substantially as described.

11. The combination, with the scale-beam and compensating levers or lazy-tongs, of a bar supported by said levers or lazy-tongs and printing-type carried by said bar, substantially as described.

12. The combination, with the scale-beam, the compensating levers or lazy-tongs, and the printing-finger, of a bar supported by said levers or lazy-tongs and yielding printing-type carried by said bar and adapted to be pushed out by said finger to give the impression, substantially as described.

13. The combination, with a weighing-scale and a type-carrier connected with and adjusted by said scale, of printing-type on said carrier, provided each with its individual yielding support, and a printing-finger for pushing out the type from which the impression is to be taken, substantially as described.

14. The combination of the carrying-bar, the separate type, the bowed springs each having a type at one end and fastened at the other to the said carrying-bar, and the printing-finger arranged in the space between the said bar and the said type, substantially as described.

15. In combination with a movable printing-finger, a type-carrier, and type on said carrier which can be pushed out independently of said carrier, type-holding teeth in front of said finger, which teeth project from their support toward said printing-finger in the direction of its motion and are formed by notches in contradistinction to slots, substantially as described.

16. The combination, with a weighing-scale, a type-carrier adjusted by said scale, type on said carrier which can be pushed out independently of said carrier, and a printing-finger behind said type, of type-holding teeth in front of said finger, which teeth project from their support toward said printing-finger in the direction of its motion and are formed by notches in contradistinction to slots, substantially as described.

17. In combination with a type-carrier and a printing-finger, printing-type which can be pushed out independently of said carrier, provided with holding-teeth movable with the type and printing-finger, substantially as described.

18. The type provided each with its individual yielding support and a holding-tooth on the type itself, in combination with the printing-finger, substantially as described.

19. The combination of the weighing-scale, the type-carrier, the printing-finger, the independently-yielding type on the said carrier, and the holding-teeth on said type themselves, so as to move with them in printing, substantially as described.

20. The combination, with a vertical card-box and printing-type for giving an impression by a horizontal movement, of a feeder for receiving the card horizontally and presenting it vertically to said type, substantially as described.

21. The many-sided feed-roller and its case, in combination with the card-box and printing-type, the said feed-roller being constructed and arranged to receive the card from said box and present it to the said type, which are arranged opposite another portion of the roller's periphery, substantially as described.

22. The combination, with the weighing-scale, the type-carrying bar adjusted by said scale, the type on said bar, adapted to be pushed out for printing, and the printing-finger, of the card-box, the feed-roller, and its case, substantially as described.

23. The combination, with apparatus to be controlled by coins, of the coin-motor and supplemental coin-holder, both connected with said apparatus, so that each coin is exposed to view or examination until one or more additional coins have been introduced and are afterward automatically discharged, substantially as described.

24. The combination, with the clock-work or power-operated mechanism and a coin-motor escapement therefor, of the supplemental coin-holder connected with said clock-work, so as to be operated thereby to discharge the coin held therein, substantially as described.

25. The combination, with the printing-finger, the clock-work or power-operated mechanism, and a coin-motor escapement for said clock-work or power-driven mechanism, of the type-carrier, the printing-type, the compensating levers or lazy-tongs, and the scale-beam, substantially as described.

26. The combination of the card-box, the feeding-roller, and the case for said roller with the printing-type, the printing-finger, the clock-work or power-driven mechanism, and the connecting devices for operating said finger and said roller in due sequence, substantially as described.

27. The combination of the scale-beam, the compensating levers or lazy-tongs, the series of scale-weights, the type-carrier, the printing-type, which can be pushed out for printing, the printing-finger, and the type-holding teeth, substantially as described.

28. The combination of the scale-beam, the compensating levers or lazy-tongs, the type-carrier, the printing-type, the printing-finger, the card-box, the card-feeder, the clock-work or power-driven mechanism, the devices for conveying motion from said clock-work to said printing-finger and to said card-feeder, and the coin-motor escapement, substantially as described.

29. The herein-described weighing and weight-printing machine with coin-motor attachment, the weighing mechanism comprising a system of compensating levers or lazy-tongs and a series of weights connected therewith, the printing mechanism comprising a carrier-bar supported by said levers or lazy-tongs, the type carried by said bar, and the means for taking impressions from the type as they may be adjusted by the weighing-scale, and the coin-motor comprising a supplemental coin-holder in addition to the devices to be acted upon by the coin to release the weight-printing mechanism, the parts being combined and operating substantially as described.

In testimony whereof I have signed this specification in the presence of two witnesses.

CLEMENT COLERIDGE CLAWSON.

Witnesses:
  GEO. W. WILKINS,
  WILLIAM F. GRAY.